(12) United States Patent
Hellwig et al.

(10) Patent No.: US 9,703,728 B2
(45) Date of Patent: Jul. 11, 2017

(54) BUS SYSTEM AND METHOD OF PROTECTED MEMORY ACCESS

(71) Applicant: Infineon Technologies AG, Neubiberg (DE)

(72) Inventors: Frank Hellwig, Wunstorf (DE); Simon Cottam, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 32 days.

(21) Appl. No.: 14/494,078

(22) Filed: Sep. 23, 2014

(65) Prior Publication Data

US 2015/0089175 A1    Mar. 26, 2015

(30) Foreign Application Priority Data

Sep. 26, 2013   (DE) .......... 10 2013 016 114

(51) Int. Cl.
*G06F 12/14*    (2006.01)
*G06F 13/28*    (2006.01)

(52) U.S. Cl.
CPC .......... *G06F 12/1458* (2013.01); *G06F 13/28* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 8,015,389 B2 | 9/2011 | Sato et al. | |
| 2004/0064604 A1* | 4/2004 | Cox | ..... G06F 21/6218 710/36 |
| 2007/0011419 A1 | 1/2007 | Conti | |
| 2007/0174507 A1 | 7/2007 | Conti | |
| 2008/0126612 A1* | 5/2008 | Barrow | ..... G06F 13/28 710/34 |
| 2011/0185094 A1 | 7/2011 | Okada | |

* cited by examiner

*Primary Examiner* — Midys Rojas
(74) *Attorney, Agent, or Firm* — Eschweiler & Potashnik, LLC

(57) ABSTRACT

A bus system includes a functional unit to which a unit identifier is assigned, a memory module for storage of data that has a storage region, and a bus. The functional unit is connected to the memory module via the bus. The storage region is configured such that one or more multiple global authorized identifiers are assigned thereto, so that the functional unit only has reading or writing access to the storage region if the unit identifier assigned to the functional unit corresponds to one of the global authorized identifiers assigned to the storage region.

14 Claims, 5 Drawing Sheets

501 | Assign an identifier to a functional unit

502 | Assign permissible identifiers to a storage unit

503 | Access the storage region

BUS SYSTEM AND METHOD OF PROTECTED MEMORY ACCESS

REFERENCE TO RELATED APPLICATION

This application claims priority to German application number 10 2013 016 114.2 filed on Sep. 26, 2013.

FIELD

The disclosure relates to a bus system and a microcontroller with such a bus system, as well as to a method of protected access to storage regions of a memory module connected to the bus system.

BACKGROUND

Microcontrollers carry out many control functions in electrical systems, particularly in applications for automobiles. For the programs (software) executed on microcontrollers there are various requirements concerning safety and reliability, particularly in these automobile applications. Thus, for example, in access to certain hardware components, the control of certain safety-relevant operations, such as airbag control or braking system control, is assigned a higher priority than less important operations, and the control software itself must be specially protected against manipulation from external and internal intervention.

The control software is conventionally stored in memories, which are accessible in a reading or writing mode by, e.g., a processing unit (CPU). For the above-stated reasons, the access to specific storage regions must be protected and must be provided with preferred priorities. Access to storage regions which are to be protected may be regulated by specific identifiers which are associated with functional units which functional units are intended to access these storage regions.

Conventionally, for reading or writing access of a CPU, or a program running on the CPU, to a specific storage region of the memory, a DMA controller is used, in order to relieve the CPU from the simple task of data transfer.

The DMA controller uses logical DMA channels in order to transfer data, e.g. to a storage region. If a particular storage region is to be protected for the above-stated reasons, one needs to ensure that this protection is not bypassed by the use of DMA channels. Therefore, DMA channels need to be particularly protected in the case of safety-critical data.

U.S. 2007/0174507 A1 discloses a system with a processor, a memory, and a DMA controller, where the DMA channels support the use of so-called qualifiers, and, together with a firewall, reduce the protection from attacks on the DMA channels.

The firewall allows or blocks the association of a qualifier with a DMA channel and thereby the association of data with a corresponding DMA channel. The association is carried out via corresponding configuration registers.

SUMMARY

Accordingly, the present disclosure provides a bus system which allows flexible protection in a cost-effective manner.

The present disclosure solves the problem of prioritizing data transfers via DMA controllers in accordance with the significance of the DMA channels used.

A bus system includes a functional unit to which a unit identifier is assigned, a memory module for storage of data, wherein the memory module has a storage region, and a bus, wherein the functional unit can be connected to the memory module via the bus. The storage region is configured such that one or multiple global authorized identifiers are assigned thereto, so that the functional unit only has reading or writing access to the storage region if the unit identifier assigned to the functional unit corresponds to one of the global authorized identifiers assigned to the storage region.

DETAILED DESCRIPTION

The following detailed description makes reference to the accompanying drawings which constitute a part of the disclosure of the disclosure and in which, for purposes of illustration, special example embodiments are shown, whereby the disclosure can be practically realized. It is understood that other example embodiments may be employed, and that structural and other changes may be implemented, without going beyond the scope of protection of the present disclosure. Thus, the following detailed description should not be regarded as being limitative. Rather, the scope of protection of the present disclosure is defined only by the accompanying patent claims.

Embodiments of the disclosure relate to bus systems with functional units, e.g. one or multiple CPUs, and a memory module connected to the bus, and a DMA controller with a specific number of DMA channels. The DMA channels are assigned to one or more channel groups, wherein each such channel group is assigned specific unit identifiers via corresponding configuration registers, through which the access to specific storage regions is controlled.

Figure 1:
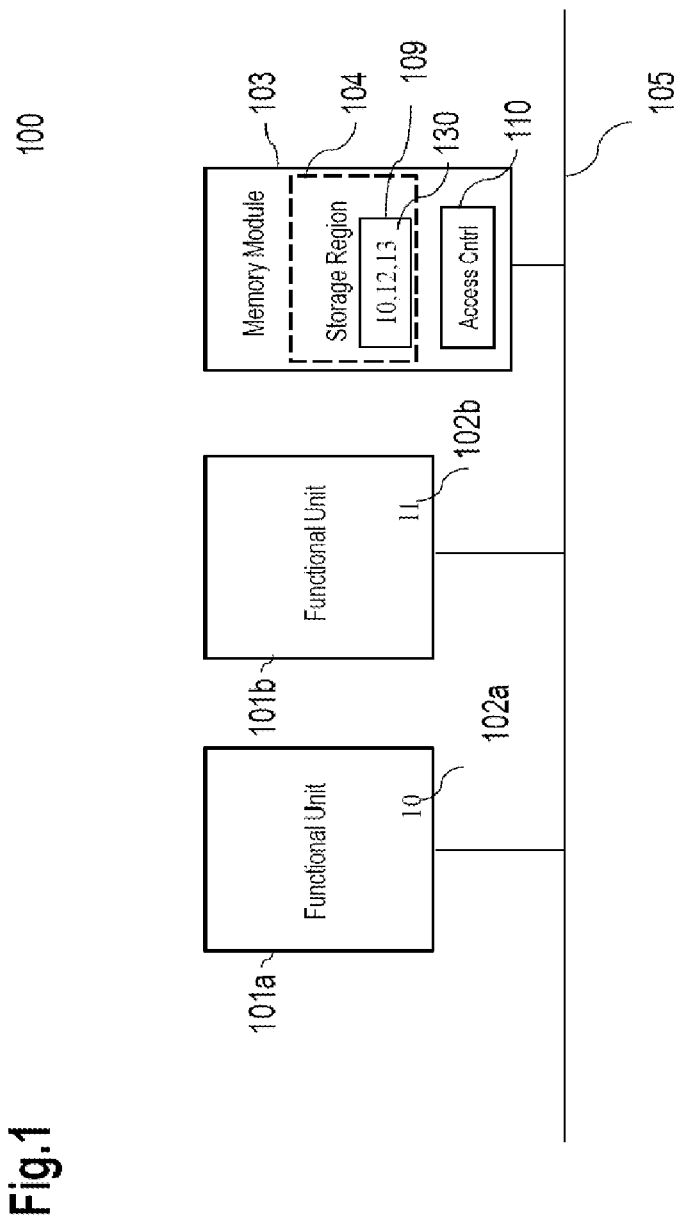
FIG. 1 illustrates an example embodiment of a bus system 100.

FIG. 1 illustrates a bus system 100 with a bus 105 and two functional units 101*a* and 101*b*, as well as a memory module 103 connected with the bus, which memory module has a storage region 104.

The bus 105 serves for data transfer between the functional units 101*a* and 101*b* connected to the bus and the memory module 103. The functional units 101*a* and 101*b* and the memory module 103 are connected to the bus 105 by an interface (not illustrated in FIG. 1).

A functional unit is, e.g., an electrical circuit which can perform a particular function. To carry out the function, data can be input to the functional units 101*a* or 101*b* via an interface (not illustrated). The processed data can then be output to the bus 105 via an interface (not illustrated).

One of the functional units 101*a* and 101*b* may be a "bus master", i.e. the functional unit 101*a* or 101*b* receives control over the bus 105 and subsequently independently initiates data transfers via the bus 105. Such a functional unit may be, e.g., an autonomously operating analog-to-digital converter. One of the functional units 101*a* or 101*b* may also be a CPU on which one or multiple programs are executed. Both functional units 101*a* and 101*b* may also be different CPUs.

Each of the functional units 101a and 101b connected to the bus is assigned a respective specific unit identifier 102a or 102b. For example, the functional unit 101a is assigned the value "10" as a specific unit identifier 102a, and the functional unit 101b is assigned the value "11" as a specific unit identifier 102b.

The unit identifiers 102a and 102b can be uniquely assigned to the functional units 101a and 101b, so that the respective functional unit may be classified via the unit identifier. However, the same unit identifier may be assigned to multiple functional units.

The unit identifier 102a or 102b can be assigned to the functional unit 101a or 101b via an electrical circuit (not illustrated), which is unchangeable in an embodiment during operation.

For a case in which the functional unit 101a or 101b is a CPU on which a specific program is executed, the functional unit is assigned a unit identifier that corresponds to the type of the program.

In an embodiment, the memory module 103 is connected with the bus 105 via an interface which is not illustrated in FIG. 1. The memory module 103 may include a RAM (Random Access Memory), in particular an SRAM (Static RAM), DRAM (Dynamic RAM), MRAM (Magnetic RAM), or ROM (Read-Only Memory), in particular flash memories, OTPs and EEPROMs.

In a further embodiment (not shown), the memory module may be a part of a functional unit. In this case, the memory module may be constituted by a register bank. In a further embodiment (not illustrated), the memory module may include two parts, wherein a first separate part is connected to the bus and a second part of the memory module is integrated into a functional unit.

The memory module 103 has a storage region 104 and additional storage regions (not illustrated in FIG. 1) in which data can be written and stored, or from which data can be read. In one embodiment a storage region may contain data which particularly must be protected against access. The memory module also includes control means for access control 110.

The functional units 101a and 101b connected to the bus 105 can access the storage region 104 of the memory module 103 either in read mode, or write mode, or read and write mode. However, access to the storage region 104 is authorized only for certain functional units. For this purpose, the storage region 104 has a configuration register 109 which contains the global authorized identifier(s) 130 whose functional units are authorized for access. In a planned access to the storage region 104 by a functional unit (101a or 101b), the control means for access control 110 compares the global authorized identifiers 130 with the unit identifier (102a or 102b) assigned to the functional unit. Only if this unit identifier belongs to the group of the authorized identifiers 130 will access be allowed in one embodiment.

The global authorized identifiers 130 may be composed, e.g., of three groups of global authorized identifiers (not illustrated in FIG. 1). A first group allows only reading access, a second group allows only writing access, and a third group of global authorized identifiers allows both reading and writing access to the storage region 104. For example, the global authorized identifier "10" can be from a group of global authorized identifiers that allow only reading access, and the global authorized identifier "11" can be from a group of global authorized identifiers that allow only writing access. In this case, the connected functional unit 101a can have only reading access to the storage region 104, and the connected functional unit 101b can have only writing access to the storage region 104.

The storage region 104 in which, e.g., data are to be written is defined by a memory address range (not illustrated). The storage region 104 is accessed by applying a memory address to the memory module 103. For writing access, a predetermined data pattern is fed to the bus 105. The memory module 103 receives this data pattern via its interface (not illustrated in FIG. 1). Part of the data pattern input to the bus 105 may be the memory address. However, the memory address can be applied to another bus (not illustrated in FIG. 1). The memory address defines the storage region where the writing is to occur, if there are multiple storage regions in the memory module 103.

According to convention, the use of DMA channels is controlled by qualifiers. If, e.g., a particular DMA channel is to be used by the software, it is decided with the aid of a list of predefined qualifiers whether the respective DMA channel may be used. Only the use of particular DMA channels is protectable. One cannot realize protection of different storage regions independently of the DMA channel. Thus, the advantage over conventional solutions lies in a more flexible protection mechanism.

Figure 2:
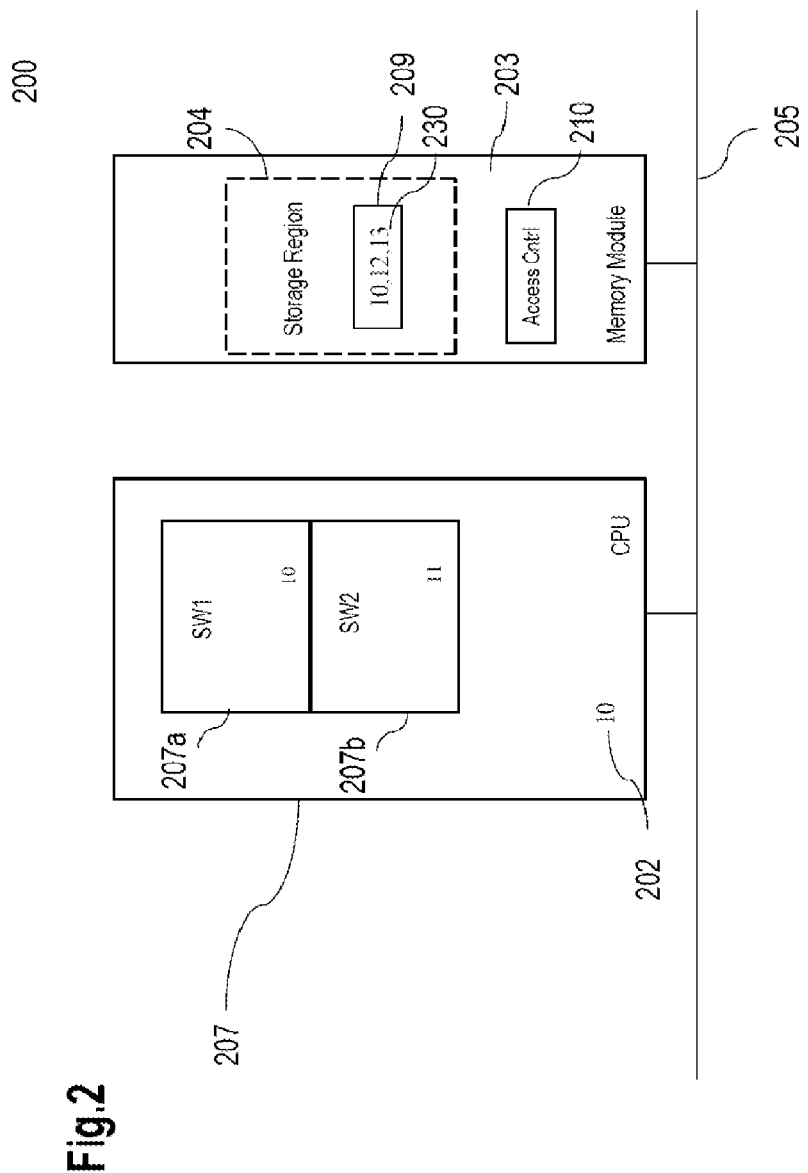
FIG. 2 illustrates another example embodiment of a bus system 200.

FIG. 2 illustrates a bus system 200 with a bus 205, a functional unit 201 in the form of a CPU, and a memory module 203 which has a storage region 204. The CPU 201 and the memory module 203 are connected to the bus 205 via interfaces (not illustrated in FIG. 2).

FIG. 2 also shows two different programs 207a and 207b which can be executed by the CPU 207. If under application of this example embodiment the first program 207a is being executed on the CPU 201, the CPU 201 is assigned the value "10" as the unit identifier 202. If on the other hand the second program 207b is being executed on the CPU 201, the CPU 201 is assigned the value "11" as the unit identifier 202.

The first part of the software (SW1) may be a program for safety-relevant functions. For example, this part may involve control of an airbag system in an automobile. The second part of the software (SW2) may be a program that the user has implemented (user code).

The memory module 203 has a storage region 204 whose data can be accessed via the bus 205, wherein the access to the storage region 204 is limited. For this purpose, the storage region 204 has a configuration register 209 containing the global authorized identifier(s) 230 authorized for access. Also, the memory module 203 has control means for the access control 210.

Thus, e.g., the CPU 201 on which safety-relevant software is running and which therefore as the unit identifier 202 shows the value "10", can access the storage region 204 via the bus 205 and can read data from the storage region 204 or can write data to the this region. On the other hand, when software implemented by the user is running on CPU 201, and the CPU 201 thus is assigned the value "11" as the unit identifier 202, the CPU 201 can neither read from nor write to the storage region 204, because the value "11" does not belong to the group of authorized identifiers 230.

In an embodiment not illustrated, the program 207a can be executed on a first CPU to which then as the unit identifier the value "10" is assigned, while the second program 207b can be executed on a second CPU to which then as the unit identifier the value "11" is assigned.

In a further embodiment not illustrated, the CPU 201 and the memory module 203 are combined into one functional unit which is connected to the bus 205.

Figure 3:
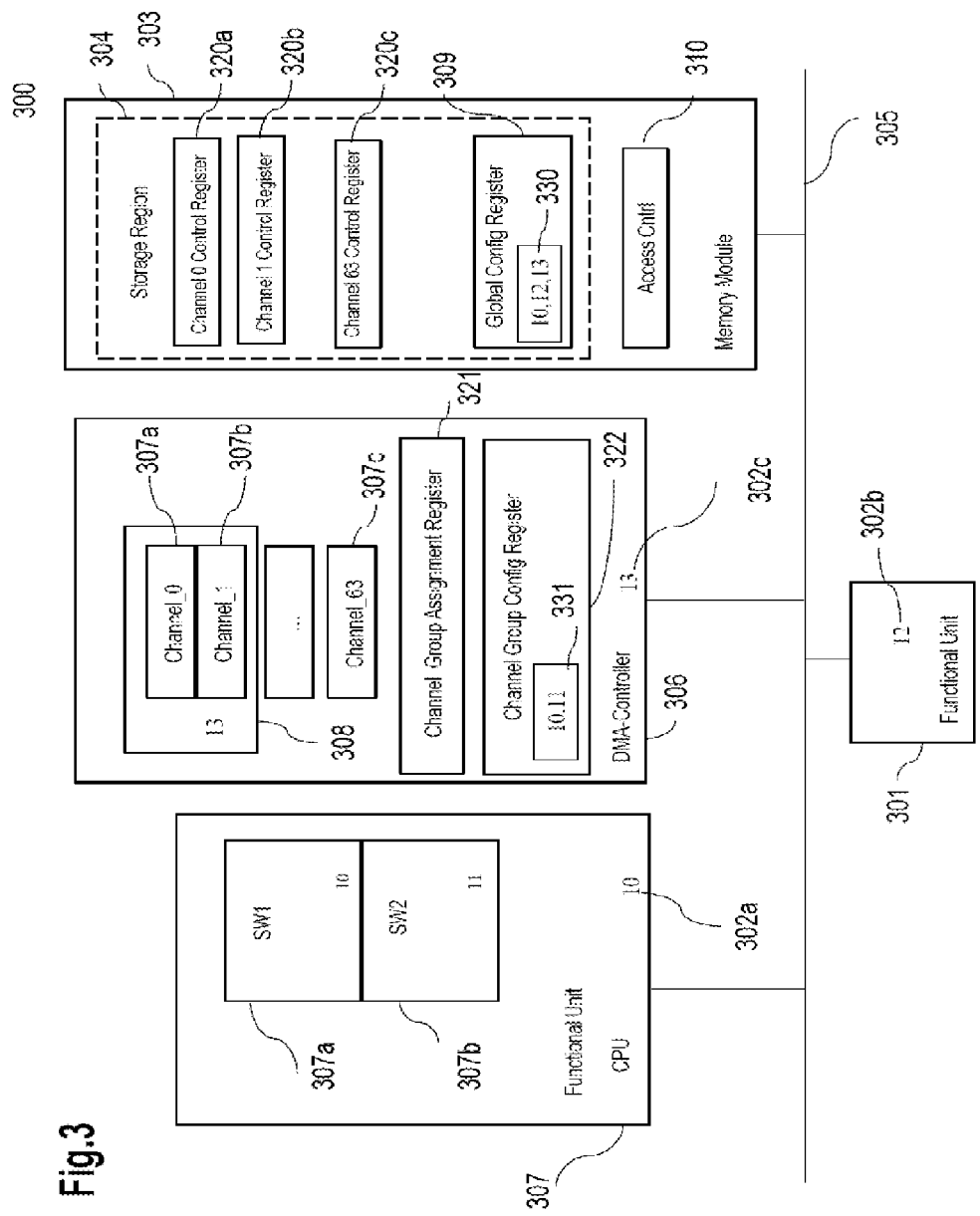
FIG. 3 illustrates another example embodiment of a bus system 300.

FIG. 3 shows, as a further example embodiment, a bus system 300 with a bus 305, which also has a DMA controller 306 in addition to a CPU 307, a functional unit 301, and a memory module 303. The memory module 303 has a storage region 304. Also, the memory module 303 has a control means for access control 310.

In this example embodiment, the CPU 307, the functional unit 301, the DMA controller 306, and the memory module 303 are connected with the bus 305 via interfaces (not illustrated). According to a further example embodiment, the memory module may be part of the CPU 307 or the functional unit 301 or a part of the DMA controller.

Two programs 307a and 307b can be executed on the CPU 307. The programs 307a and 307b may each process data which are read by the CPU 307 from the bus 305 via an interface (not illustrated). After corresponding processing, the CPU 307 may deliver data to the bus 305. For example, when the program 307a is being executed on the CPU 307, the CPU 307 is assigned the value "10" as the unit identifier 302a. For example, when the program 307b is being executed on the CPU 307, the CPU 307 is assigned the value "11" as the unit identifier 302a.

The functional unit 301 can read data from and write data to the bus 305 via an interface (not illustrated). The functional unit 301 is assigned a specific unit identifier 302b. This assignment can be brought about via an electrical circuit inside the functional unit 301. In an embodiment the unit identifier is thereby unchangeable. The unit identifier can also be stored in a register and is thus programmable.

The function of a DMA controller (direct memory access controller) conventionally includes independently conducting data transfer via the bus 305 and therefore relieving the CPU 307. The DMA controller 306 contains a plurality of DMA channels (307a, 307b, 307c), wherein the number may be, e.g., 8, 16, 32, or 64. The DMA controller according to FIG. 3 has 64 DMA channels; here, FIG. 3 shows the DMA channel_0 307a, the DMA channel_1 307b, and the DMA channel_63 307c as examples. Direct data transfer without CPU participation occurs between functional units, or between functional units and a memory module, via a DMA channel. For each DMA channel there is an assigned channel control register. FIG. 3 shows as a corresponding example the channel control register 320a for the DMA channel 307a, the channel control register 320b for the DMA channel 307b, and the channel control register 320c for the DMA channel 307c. As an example the channel control registers are shown as part of the storage region 304.

A specific number of DMA channels can be combined into channel groups. As shown in FIG. 3, e.g., the DMA channels 307a and 307b can be combined into one channel group 308. Further channel groups (not illustrated in FIG. 3) can be formed by any desired combination of DMA channels. In an application of this example embodiment, each DMA channel can be associated with only one particular channel group. The association of a DMA channel with a channel group can be realized via a channel group assignment register 321.

By appropriate programming of the respective channel control register (e.g. 320a, 320b, and 320c) it is determined which functional units will use which DMA channel. Thus, e.g., the channel control registers 320a and 320b can be configured such that the functional unit 301 can use the two DMA channels and thus the channel group 308.

Each channel group can be configured via assigned channel group control registers. FIG. 3 illustrates as an example the channel group control register 322 for the channel group 308. The respective channel group control register can contain a list of local authorized identifiers 331 via which the access to the channel control register is controlled. If, for example, the functional unit 301 with the unit identifier "12" wants to use the channel group 308 but "12" is not on the list of local authorized identifiers, access to the channel group control registers 320a and 320b is denied. The comparison of the unit identifier 302b and authorized local identifiers 331 can be carried out via the control means for the access control 310. In a further example of this embodiment (not illustrated), the DMA controller can have its own control means for controlling the access to the channel control register.

The comparison of the unit identifier with the list of local authorized identifiers allows protection against use of DMA channels that are not to be accessed for use by particular functional units.

Each channel group can be assigned a specific unit identifier. Thus, for example, in FIG. 3 the channel group 308 is assigned the value "13" as the unit identifier 302c. A data transfer which uses the channel group 308 is thus, e.g., identifiable via the identifier "13".

The memory module 303 has a storage region 304. In the storage region 304, data can be written which are applied to an interface (not illustrated) of the memory module 305 via the bus 305. Data can be read from the storage region 304 which can then be output to the bus 305 via an interface (not illustrated). The storage region 304 is shown in FIG. 3 as a part of a separate memory module connected to the bus 305. However, in a further example embodiment (not illustrated), the memory module can be a part of the functional unit 301 or part of the CPU 307 or of the DMA controller.

The global authorized identifiers 330 are assigned to the storage region 304. For this purpose, in an example embodiment, the storage region 304 is configured via a configuration register 309. Using the configuration register 309, then, the global authorized identifiers 330 authorized for reading or writing access can be defined. For example, the control means for the access control 310 can compare the entries in the register 309 with the unit identifiers of the functional units which want to access the storage region 304. Access to the storage region 304 is thus limited to functional units which have been assigned a global authorized identifier 330 which is authorized for the storage region 304.

For example, the configuration register 309 of the storage region 304 is implemented in the storage region 304. It can also be implemented in a further storage region (not illustrated).

In an example embodiment, data from the functional unit 301 can be transferred to the memory module 303 via the bus 305 with the aid of the channel group 308 of the DMA controller 306. For example, for the case in which the channel group 308 is assigned the value "13" as the unit identifier 302c, and this unit identifier is not authorized for access to the storage region 304, the functional unit 301 is denied access to the storage region 304 via the DMA controller.

In a further application of this example embodiment, a data transfer is started by a program 307a that is executed on the CPU 307 to which hence the value "10" is assigned as the unit identifier. Storage of data in the storage region 304 of the memory module 303 is possible if the unit identifier "10" is authorized for access to the storage region 304.

In the described examples, access to the storage region 304 is controlled via the unit identifiers 302a, 302b, and 302c. The storage region 304 has a global configuration register 309 in which it is determined which unit identifiers will have access to the storage region 304.

Since the access to specific storage regions requires authorized identifiers, in an embodiment (not shown) a specific program can exchange data per DMA with other functional units via a defined storage region only under specific constraints. This program is executed, for example, on a CPU and uses DMA channels of a particular channel group. Thus, with access to a specific storage region the assigned unit identifier for the channel group will be compared with the entries in the configuration register of the storage region. Similarly, the unit identifier of the functional unit will be compared with the entries in the configuration register of the storage region. Only if both unit identifiers are registered in the configuration register of the storage region can data exchange between the CPU and the functional unit take place.

Thus the access rights are defined by assignments between unit identifiers and corresponding storage regions.

In a further example embodiment, the entries in the configuration register 309 of the storage region 304 can be changed. However, this change can only be carried out by functional units which have access to the configuration register 309.

The configuration register 309 can be implemented in the storage region 304. The configuration register 309 can also be implemented in a further storage region (not illustrated).

In another example embodiment, the program 307a being executed on the CPU 307, which program has access to the configuration register 309 of the storage region 304 in accordance with its unit identifier, can allow access of the channel group 308 to the storage region 304.

The various DMA channels of the DMA controller 306 can have different priorities, i.e., such that a DMA channel with a higher channel priority in comparison to a DMA channel with a lower channel priority will have preferred access to the bus, and can thereby carry out the data transfer defined by its configuration.

These priorities may be decreased or increased, e.g. with increasing channel number. If, for example, the functional unit 301 is assigned the DMA channel 307a, in an example embodiment this would have a higher priority than, for example, the program 307a running on CPU 307 when it uses the DMA channel 307b.

Figure 4:
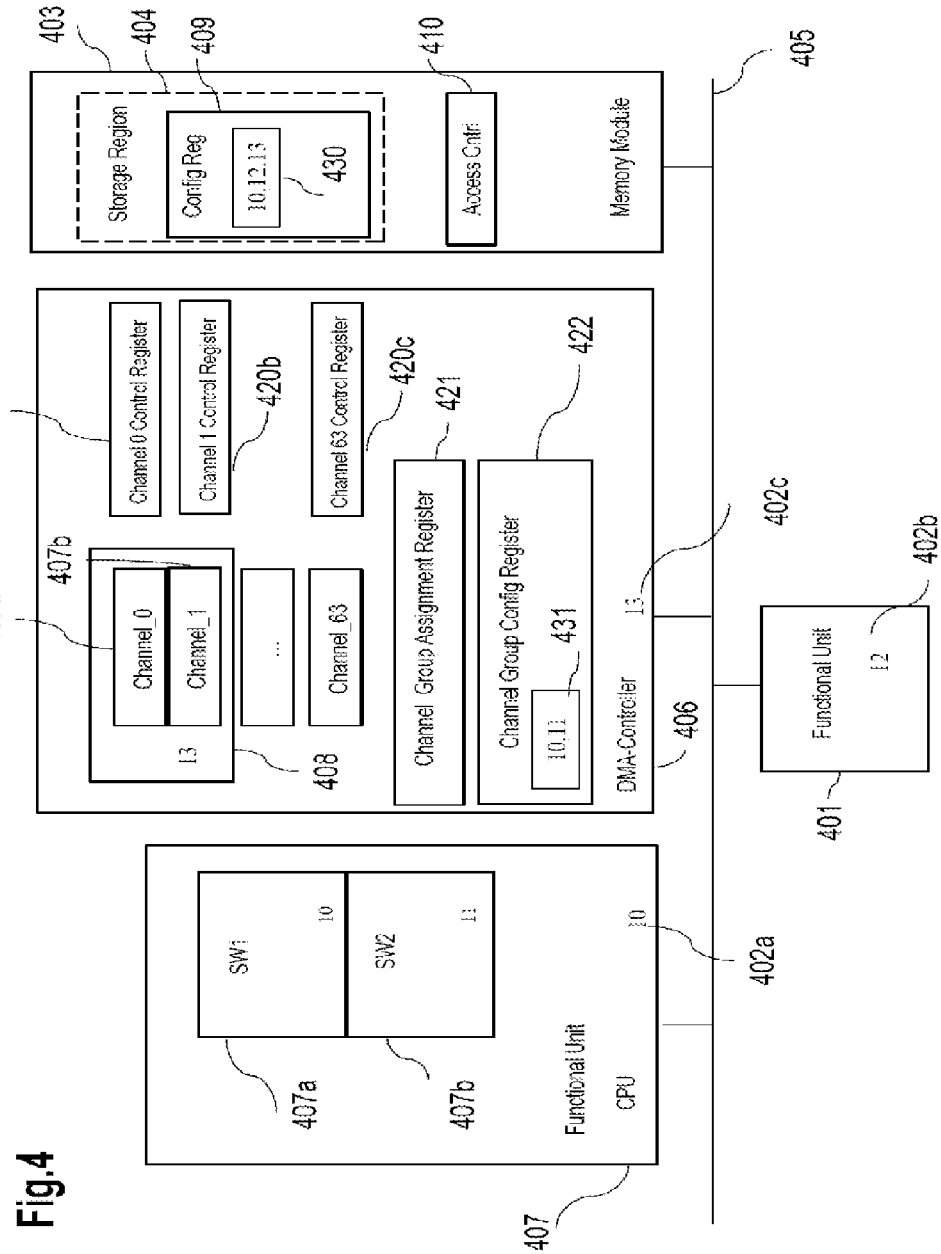
FIG. 4 illustrates another example embodiment of a bus system 400.
Figure 5:
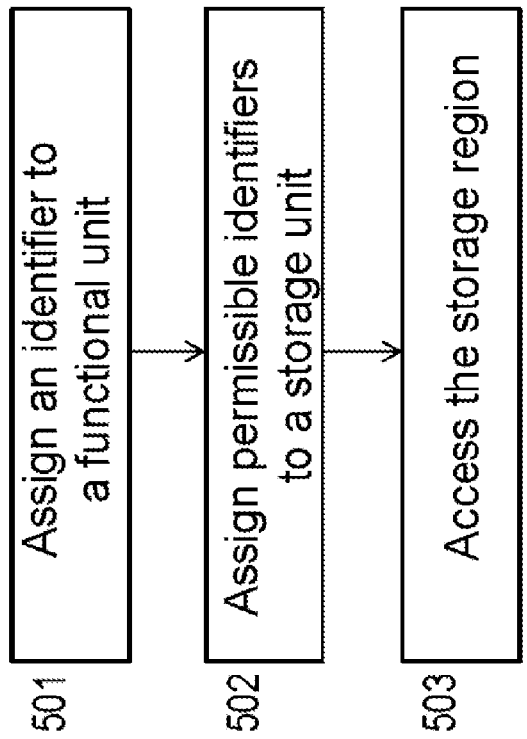
FIG. 5 illustrates an example embodiment for a method of protected memory access.

FIG. 4 illustrates a further example embodiment of a bus system 400, in which, in contrast to FIG. 3, the channel control registers (e.g. 420a, 420b, and 420c) are implemented in the DMA controller 406.

The invention claimed is:

1. A bus system, comprising:
a functional unit which is assigned a unit identifier, wherein the functional unit comprises a central processing unit (CPU) configured such that a program is executed thereon, so that the CPU is assigned an identifier which corresponds to the program;
a memory module for storage of data, wherein the memory module has a storage region; and
a bus, wherein the functional unit is connected to the memory module via the bus;
wherein the storage region is configured such that one or multiple global authorized identifiers are assigned thereto, so that the functional unit only has access to the storage region if the unit identifier assigned to the functional unit corresponds to one of the global authorized identifiers assigned to the storage region.

2. The bus system according to claim 1, wherein at least one of the global authorized identifiers assigned to the storage region is selectable from a group of global authorized identifiers which allows only reading access to the storage region.

3. The bus system according to claim 1, wherein at least one of the global authorized identifiers assigned to the storage region is selectable from a group of global authorized identifiers which allows only writing access to the storage region.

4. The bus system according to claim 1, wherein the unit identifier is determined by an electrical circuit.

5. The bus system according to claim 1, wherein the unit identifier is determined by a programmable register.

6. The bus system according to claim 1, further comprising a direct memory access (DMA) controller connected to the bus, wherein the DMA controller has a plurality of DMA channels which are programmable via a channel control register, and wherein the DMA controller is configured to form the functional unit by a group of DMA channels.

7. The bus system according to claim 6, wherein the DMA controller is configured to assign to the channel groups local authorized identifiers, so that only the functional units have access to the channel control register, whose unit identifiers correspond to an assigned local authorized identifier.

8. The bus system according to claim 6, wherein each of the plurality of DMA channels is assigned a channel priority, so that an ongoing data transfer via a DMA channel with a lower channel priority is interrupted if a DMA channel with a higher channel priority starts a data transfer.

9. The bus system according to claim 1, wherein the global authorized identifiers authorized for access to the storage region are stored in a configuration register of the storage region.

10. The bus system according to claim 1, wherein the local authorized identifiers authorized for access to the channel control register are stored in a channel group control register.

11. The bus system of claim 1, wherein the functional unit is a microprocessor.

12. A method of protected access to storage regions of a memory module, comprising:
assigning a unit identifier to a functional unit, wherein the functional unit comprises a central processing unit (CPU) configured such that a program is executed thereon, so that the CPU is assigned an identifier which corresponds to the program;
assigning global authorized identifiers to a storage region of the memory module; and
providing access to the storage region by the functional unit via a bus that connects the functional unit and the memory module only if the functional unit is assigned a unit identifier which corresponds to a global authorized identifier.

13. The method of claim 12, wherein at least one of the global authorized identifiers assigned to the storage region is selectable from a group of global authorized identifiers which allows only reading access to the storage region.

14. The method of claim 12, wherein at least one of the global authorized identifiers assigned to the storage region is selectable from a group of global authorized identifiers which allows only writing access to the storage region.

* * * * *